United States Patent [19]

Kadokawa

[11] Patent Number: 4,778,286
[45] Date of Patent: Oct. 18, 1988

[54] BEARING ASSEMBLY
[75] Inventor: Satoshi Kadokawa, Fujisawa, Japan
[73] Assignee: Nippon Seiko Kabushiki Kaisha, Tokyo, Japan
[21] Appl. No.: 94,450
[22] Filed: Sep. 9, 1987
[30] Foreign Application Priority Data
  Oct. 9, 1986 [JP] Japan .......................... 61-154407[U]
[51] Int. Cl.[4] .............................................. F16C 19/08
[52] U.S. Cl. ..................................... 384/446; 384/448; 340/682
[58] Field of Search ............... 384/446, 448, 484, 485, 384/482, 512; 340/682

[56] References Cited
U.S. PATENT DOCUMENTS

| 4,063,786 | 12/1977 | Rall | 340/682 |
|---|---|---|---|
| 4,092,053 | 5/1978 | Riegler | 384/448 |
| 4,688,951 | 8/1987 | Guers | 384/448 |
| 4,732,494 | 3/1988 | Guers | 384/446 |

Primary Examiner—Lenard A. Footland
Attorney, Agent, or Firm—Shapiro and Shapiro

[57] ABSTRACT

A bearing assembly includes a bearing including a rotatable inner race having a mounting portion integral with a rotatable member and having an annular first groove for rolling members formed in the outer peripheral surface thereof, an outer race fixedly disposed outside and concentrically with the inner race and having a second groove for rolling members formed in the inner peripheral surface thereof in opposed relationship with the first groove for rolling members, a plurality of rolling members interposed between the first and second grooves for rolling members, and a pair of seals disposed on the axially opposite outer sides of the rolling members for sealing the space between the inner and outer races; a pulser gear formed on that portion on the outer peripheral surface of the inner race which is positioned between the pair of seals and having convex portions and concave portions alternately formed circumferentially on the outer peripheral surface thereof; and a sensor mounted on the inner race and opposed to the pulser gear, the number of rotations of the rotatable member being detected by the pulser gear and the sensor.

3 Claims, 1 Drawing Sheet

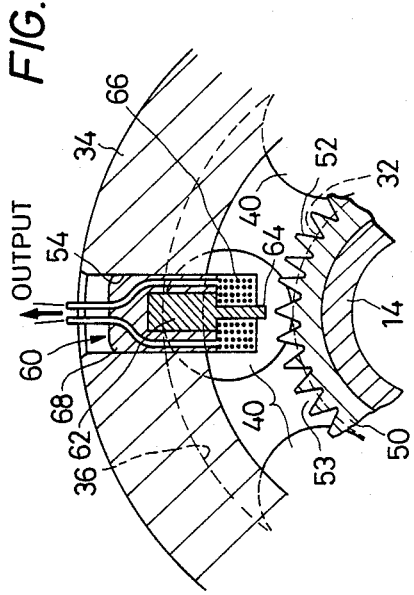
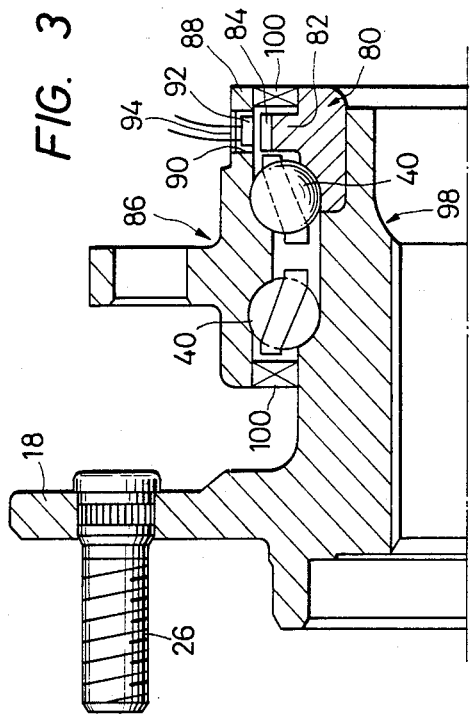
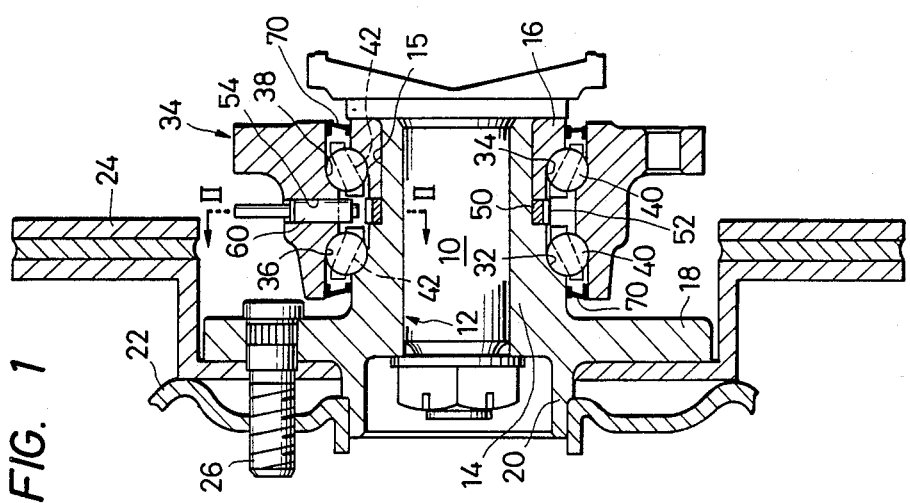

BEARING ASSEMBLY

BACKGROUND OF THE INVENTION

1. Field of the Invention

The present invention relates to a bearing assembly, and in particular to improvements in a bearing assembly capable of detecting the number of rotations of a rotatable member made integral with an inner race.

2. Description of the Prior Art

In various industrial machines, there arises the necessity of using a bearing assembly to support a rotatable member and moreover detecting the number of rotations of the rotatable member. An example of it is an anti-skid brake system in a vehicle. This is an apparatus for detecting the number of rotations of wheels and momentarily releasing the brake when the wheels are about to be locked, thereby preventing the locking of the wheels. For the detection of the number of rotations, use is suitably be made of a pulser gear fixed to the rotatable member and an electromagnetic pick-up type sensor fixedly disposed in proximity to the pulser gear.

There has heretofore been a sensor forced into the outer racer of a bearing assembly and having a portion thereof exposed outwardly from the outer race. Accordingly, if a vehicle runs in rainy weather, the sensor is splashed with rainwater and becomes rusty or foreign materials and dust from muddy water and brake pads adhere to the sensor to stain the latter or gravel flies to the sensor and impinges thereon (chipping), and this has adversely affected the result of detection. Yet, if a protective cover or the like is provided to prevent the sensor from being splashed with rainwater, it will correspondingly lead to an increase in number of parts which will also result in complication of the structure. Also, the detecting function may be reduced by the offset between the sensor and the pulser gear.

SUMMARY OF THE INVENTION

It is the object of the present invention to solve the above-noted problems peculiar to the prior art and to provide a bearing assembly contrived so that the sensor does not become rusty by rainwater or is not adversely affected by dust or the like.

To achieve the above object, in the present invention, a pulser gear and a sensor are disposed in a space sealed by the seal on one of both sides between the inner and outer races of the bearing. As such a location for disposition, for example, the space between adjacent grooves for rolling members in a double-row bearing is suitably selected.

In the present invention, in a bearing assembly wherein the number of rotations of a rotatable member made integral with the inner race of a bearing is detected, a pulser gear and a sensor for detecting the number of rotations are disposed in the portions on the inner and outer races which are sealed from the outside of the bearing. Therefore, the pulser gear and sensor are prevented from being splashed with rainwater, muddy water or the like and rusting of these elements is prevented and also, chipping and adherence of dust are prevented and thus, accurate detection of the number of rotations is maintained for a long period of time. Moreover, what has been described above is achieved without making the structure of the bearing assembly bulky or complicated.

BRIEF DESCRIPTION OF THE DRAWINGS

FIG. 1 is a longitudinal cross-sectional view showing an embodiment of the present invention.

FIG. 2 is a cross-sectional view taken along line II—II in FIG. 1.

FIG. 3 is a longitudinal cross-sectional view showing another embodiment of the present invention.

DESCRIPTION OF THE PREFERRED EMBODIMENTS

Some embodiments of the present invention will hereinafter be described with reference to the drawings. Description will first be made of an embodiment for detecting the number of rotations of the wheels of a vehicle. The present invention can be suitably changed within a scope which will not mar the gist thereof, and the subject of application thereof is not limited to wheels and the structure of the pulser gear and sensor can also be improved. Referring to FIG. 1, a bolt 10 studded on a joint (not shown) has an inner race 12 rotatably fitted thereon, and this inner race comprises a body 14 and an annular member 16 fitted thereto. The body 14 has a flange portion 18 extending radially thereof and a cylindrical portion 20. A wheel 22 is fitted on the cylindrical portion 20, and a brake disk 24 is in intimate contact with the flange portion 18, these being made integral with the inner race body 14 by a bolt 26 extending through the flange portion 18. Annular ball rolling grooves 32 and 34 are formed in the outer peripheral surfaces of the body 14 and annular member 16, respectively.

On the radial side of the body 14 and annular member 16, an outer race 34 is disposed concentrically with the inner race 12 and has annular ball rolling grooves 36 and 38 in the inner peripheral surface thereof. A plurality of balls 40 provided circumferentially at intervals are retained by a retainer 42 between the pair of opposed ball rolling grooves 32 and 36 of the inner race 12 and the outer race 34 and between the ball rolling grooves 34 and 38.

As shown in FIGS. 1 and 2, the axial length of the annular member 16 is shorter than the axial length of the stepped portion 15 of the body 14, and between the fore end surface of the annular member 16 and the end surface of the shoulder of the body 14, there is left an annular gap in which a pulser gear 50 is disposed. The pulser gear 50 is fixedly fitted to the stepped portion 15 of the inner race body 14 against rotation in the inner peripheral surface thereof and has a number of circumferentially spaced apart teeth 52 on the outer peripheral surface thereof.

On the other hand, a radially extending through-hole 54 is formed in the outer race 34 at a position opposed to the pulser gear 50 in the axial direction thereof, and a sensor 60 is inserted in this through-hole 54. The sensor 60, as shown in detail in FIG. 2, comprises a permanent magnet 62 and a voltage producing coil 66 wound on the small-diametered portion 64 thereof, and the distal end portion of the coil 66 is taken outwardly. The sensor 60 has its case 68 inserted in the through-hole 54, and the fore end (the detecting portion) of the small-diametered portion 64 is proximate and opposed to the teeth 52 of the pulser gear 50. Between the opposite side edges of the outer race 34 and the portions of the inner race 12 which are opposed thereto, seals 70 are mounted on both outer sides of the two rows of balls 40.

The operation and effect of the present embodiment will now be described. When the inner race 12 rotates with the wheel 22 and brake disk 24, the pulser gear 50 also rotates therewith and thus, the teeth 52 and the valley 53 between adjacent teeth alternately pass the front of the detecting portion of the sensor 60. As a result, the magnetic line of force produced from the magnet 64 is varied to produce an induced current and the magnitude of the voltage thereof varies periodically and therefore, by examining the frequency of the variation per unit time, the number of rotations of the wheel 22 can be detected.

In this case, the sensor 60 is fully pushed into the through-hole 54 of the outer race 34, and the detecting portion which is particularly easy to rust is positioned in the annular space between the inner race 12 and the outer race 34. This space is protected from its surroundings by the seals 70, balls 40 and retainer 42. Accordingly, the detecting portion is prevented from being splashed with rainwater to rust, or dust, gravel or the like is prevented from adhering to or impinging on the detecting portion to adversely affect the result of detection.

In another embodiment shown in FIG. 3, teeth 84 as a pulser gear are formed on the outer peripheral surface of a flange portion 82 formed radially outwardly on the outer peripheral surface of an annular member 80, and a sensor 92 is mounted in a mounting hole 90 in a cylindrical portion 88 axially extending from a side edge of an outer race 86 and is covered with a lid 94. A pair of seals 100 are mounted between the both side edges of the outer race 86 and the portions of an inner race 98 which are opposed thereto, whereby the space between the inner race 98 and the outer race 86 is protected from its surroundings.

Accordingly, the sensor 92 will not be splashed with rainwater or dust will not adhere to the sensor 92 and thus, the number of rotations of the wheels can be accurately detected by the sensor 92. Also, since the sensor 92 is made compact, the structure of the assembly will not become bulky.

I claim:

1. A bearing assembly including:

a bearing including a rotatable inner race having a mounting portion integral with a rotatable member and having an annular first groove for rolling members formed in the outer peripheral surface thereof, an outer race fixedly disposed outside and concentrically with said inner race and having a second groove for rolling members formed in the inner peripheral surface thereof in opposed relationship with said first groove for rolling members, a plurality of rolling members interposed between said first and second grooves for rolling members, and a pair of seals disposed on the axially opposite outer sides of said rolling members for sealing the space between said inner and outer races;

a pulser gear formed on that portion on the outer peripheral surface of said inner race which is positioned between said pair of seals and having convex portions and concave portions alternately formed circumferentially on the outer peripheral surface thereof; and a sensor mounted on said outer race and opposed to said pulser gear, the number of rotations of said rotatable member being detected by said pulser gear and said sensor.

2. A bearing assembly including:

a bearing including a rotatable inner race having a mounting portion integral with a rotatable member and having an annular first groove for rolling members and an annular stepped portion axially juxtaposed on the outer peripheral surface thereof, an annular member fitted on the stepped portion of said inner race and having a second groove for rolling members formed in the inner peripheral surface thereof, the axial length of said annular member being shorter than that of said stepped portion, an outer race fixedly disposed outside and concentrically with said inner race and having third and fourth grooves for rolling members axially juxtaposed in the inner peripheral surface thereof in opposed relationship with said first and second grooves for rolling members and having a radial through-hole formed between said third and fourth grooves for rolling members, two rows of balls interposed between said first and third grooves for rolling members and between said second and fourth grooves for rolling members, respectively, and a pair of seals disposed on the axially opposite outer sides of said two rows of balls between said inner race or said annular member and said outer race for sealing said inner and outer races;

a pulser gear of magnetic material disposed in an annular space formed between the end surface of the stepped portion of said inner race and the end surface of said annular member which is opposed thereto and having convex portions and concave portions alternately formed circumferentially on the outer peripheral surface thereof; and a sensor mounted in the through-hole of said outer race and having its tip end proximate and opposed to the convex and concave portions of said pulser gear, the number of rotations of said rotatable member being detected by said pulser gear and said sensor.

3. A bearing assembly including:

a bearing including a rotatable inner race having a mounting portion integral with a rotatable member and having an annular first groove for rolling members and an annular stepped portion axially juxtaposed on the outer peripheral surface thereof, an annular member fitted on the stepped portion of said inner race and having an annular second groove for rolling members formed in the inner peripheral surface thereof, a fixedly disposed outer race fixedly disposed outside and concentrically with said inner race and having third and fourth annular grooves for rolling members axially juxtaposed on the inner peripheral surface thereof in opposed relationship with said first and second annular grooves for rolling members, and having a radially extending through-hole formed in the outer end portion of one of said both grooves for rolling members in the portion thereof which is opposed to the convex and concave portions of said annular member, two rows of balls interposed between said first and third grooves for rolling members and between said second and fourth grooves for rolling members, respectively, and a pair of seal members interposed between said inner race or said annular member and said outer race on the axially opposite sides of said two rows of balls for sealing the space between said inner and outer races;

a pulser gear comprising concave portions and convex portions alternately formed circumferentially on the outer peripheral surface of said annular member axially outwardly of said second annular groove for rolling members; and a sensor mounted in the through-hole of said outer race and having its tip end proximate and opposed to the concave and convex portions of said pulser gear, the number of rotations of said rotatable member being detected by said pulser gear and said sensor.

* * * * *

REEXAMINATION CERTIFICATE (3324th)
United States Patent [19]
Kadokawa

[11] B1 4,778,286
[45] Certificate Issued Sep. 16, 1997

[54] BEARING ASSEMBLY

[75] Inventor: Satoshi Kadokawa, Fujisawa, Japan

[73] Assignee: Nippon Seiko Kabushiki Kaisha, Tokyo, Japan

Reexamination Request:
No. 90/004,189, Feb. 22, 1996

Reexamination Certificate for:
Patent No.: 4,778,286
Issued: Oct. 18, 1988
Appl. No.: 94,450
Filed: Sep. 9, 1987

[30] Foreign Application Priority Data

Oct. 9, 1986 [JP] Japan ............... 61-154407 U

[51] Int. Cl.⁶ .................................................... F16C 19/08
[52] U.S. Cl. .................. 384/446; 384/448; 340/682
[58] Field of Search ........................... 384/506, 544

[56] References Cited

U.S. PATENT DOCUMENTS

| | | | |
|---|---|---|---|
| 3,192,002 | 6/1965 | Carter | 384/506 |
| 3,719,841 | 3/1973 | Ritsema | 310/155 |
| 4,960,333 | 10/1990 | Faye et al. | |
| 5,085,519 | 2/1992 | Dougherty | |

FOREIGN PATENT DOCUMENTS

| | | |
|---|---|---|
| 0 397 309 | 11/1990 | European Pat. Off. |
| 1913 813 | 10/1970 | Germany |
| 62-249069 | 10/1987 | Japan |
| 1 284 324 | 8/1972 | United Kingdom |
| 1 386 020 | 3/1975 | United Kingdom |
| WO 82/03828 | 11/1982 | WIPO |

OTHER PUBLICATIONS

RHP Aerospace Bearings Division, "Speed Sensor in a Bearing," *RHP News and Engineering*, pp. 696–698, page entitled Typical applications of RHP Revtel Bearings, and page entitled Revtel Revolution!, Jul., 1978, England.

*Primary Examiner*—Lenard A. Footland

[57] ABSTRACT

A bearing assembly includes a bearing including a rotatable inner race having a mounting portion integral with a rotatable member and having an annular first groove for rolling members formed in the outer peripheral surface thereof, an outer race fixedly disposed outside and concentrically with the inner race and having a second groove for rolling members formed in the inner peripheral surface thereof in opposed relationship with the first groove for rolling members, a plurality of rolling members interposed between the first and second grooves for rolling members, and a pair of seals disposed on the axially opposite outer sides of the rolling members for sealing the space between the inner and outer races; a pulser gear formed on that portion on the outer peripheral surface of the inner race which is positioned between the pair of seals and having convex portions and concave portions alternately formed circumferentially on the outer peripheral surface thereof; and a sensor mounted on the inner race and opposed to the pulser gear, the number of rotations of the rotatable member being detected by the pulser gear and the sensor.

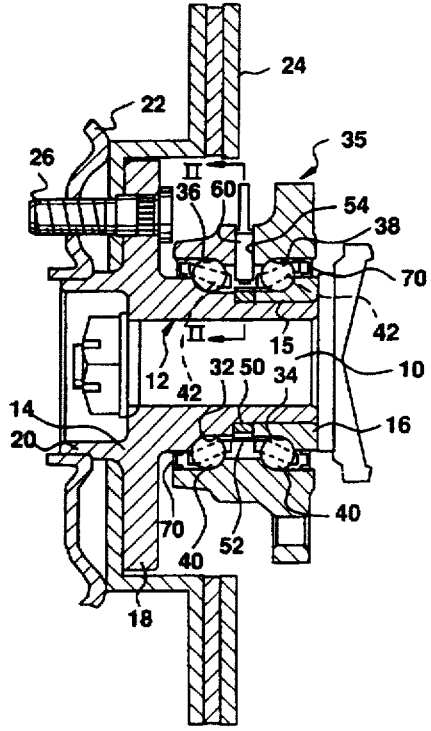

__B1 4,778,286__

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 33–41:

On the radial side of the body 14 and annular member 16, an outer race [34] *35* is disposed concentrically with the inner race 12 and has annular ball rolling grooves 36 and 38 in the inner peripheral surface thereof. A plurality of balls 40 provided circumferentially at intervals are retained by a retainer 42 between the pair of opposed ball rolling grooves 32 and 36 of the inner race 12 and the outer race [34] *35* and between the ball rolling grooves 34 and 38.

Column 2, lines 53–67:

On the other hand, a radially extending through-hole 54 is formed in the outer race [34] *35* at a position opposed to the pulser gear 50 in the axial direction thereof, and a sensor 60 is inserted in this through-hole 54. The sensor 60, as shown in detail in FIG. 2, comprises a permanent magnet 62 and a voltage producing coil 66 wound on the small-diametered portion 64 thereof, and the distal end portion of the coil 66 is taken outwardly. The sensor 60 has its case 68 inserted in the through-hole 54, and the fore end (the detecting portion) of the small-diametered portion 64 is proximate and opposed to the teeth 52 of the pulser gear 50. Between the opposite side edges of the outer race [34] *35* and the portions of the inner race 12 which are opposed thereto, seals 70 are mounted on both outer sides of the two rows of balls 40.

Column 3, lines 13–23:

In this case, the sensor 60 is fully pushed into the through-hole 54 of the outer race [34] *35*, and the detecting portion which is particularly easy to rust is positioned in the annular space between the inner race 12 and the outer race [34] *35*. This space is protected from its surroundings by the seals 70, balls 40 and retainer 42. Accordingly, the detecting portion is prevented from being splashed with rainwater to rust, or dust, gravel or the like is prevented from adhering to or impinging on the detecting portion to adversely affect the result of detection.

THE DRAWING FIGURES HAVE BEEN CHANGED AS FOLLOWS:

FIGS. 1 and 2, numeral 34 to 35.

AS A RESULT OF REEXAMINATION, IT HAS BEEN DETERMINED THAT:

Claims 1–3 are cancelled.

New claim 4 is added and determined to be patentable.

*4. A bearing assembly including:*

*a bearing including a rotatable inner race having a mounting portion integral with a rotatable member and having an annular first groove for rolling members formed in the outer peripheral surface thereof, a unitary body of an outer race and a mounting flange, wherein the outer race is fixedly disposed outside and concentrically with the inner race and having a second groove for rolling members formed in the inner peripheral surface thereof in opposed relationship with the first groove for rolling members, the outer race having a through-hole, wherein the flange is adapted to mount the outer race to a fixed member, a plurality of rolling members interposed between the first and second grooves for rolling members, and a pair of seals disposed on the axially opposite outer sides of the rolling members for sealing a space formed between the inner and outer races;*

*a pulser gear formed on a portion on the outer peripheral surface of the inner race, which portion is positioned between the pair of seals, and having convex portions and concave portions alternately formed circumferentially on the outer peripheral surface thereof, forming a plurality of circumferentially spaced apart teeth on the outer peripheral surface thereof; and*

*a sensor mounted to the outer race, opposed to the pulser gear, with at least a portion of the sensor occupying at least a portion of the through-hole, the number of rotations of the rotatable member being detected by the pulser gear and the sensor, wherein the sensor extends exclusively in the outer race in the through-hole.*

* * * * *